US010877982B1

(12) United States Patent
De Boursetty (10) Patent No.: US 10,877,982 B1
(45) Date of Patent: Dec. 29, 2020

(54) DETECTION OF POPULAR CONTENT WITH NARROW APPEAL

(71) Applicant: GOOGLE LLC, Mountain View, CA (US)

(72) Inventor: Benoît De Boursetty, Santa Monica, CA (US)

(73) Assignee: Google, LLC, Mountain View, CA (US)

(*) Notice: Subject to any disclaimer, the term of this patent is extended or adjusted under 35 U.S.C. 154(b) by 23 days.

(21) Appl. No.: 16/430,337

(22) Filed: Jun. 3, 2019

Related U.S. Application Data

(63) Continuation of application No. 14/718,840, filed on May 21, 2015, now abandoned.

(60) Provisional application No. 62/001,597, filed on May 21, 2014.

(51) Int. Cl.
*G06F 16/2457* (2019.01)
*G06F 16/951* (2019.01)

(52) U.S. Cl.
CPC ...... *G06F 16/24578* (2019.01); *G06F 16/951* (2019.01)

(58) Field of Classification Search
CPC .................. G06F 16/24578; G06F 16/951
See application file for complete search history.

(56) References Cited

U.S. PATENT DOCUMENTS

| 8,600,796 | B1 | 12/2013 | Sterne et al. |
| 8,706,655 | B1 | 4/2014 | Rangarajan et al. |
| 2001/0044795 | A1 | 11/2001 | Cohen et al. |
| 2003/0037034 | A1 | 2/2003 | Daniels et al. |
| 2005/0055357 | A1 | 3/2005 | Campbell |
| 2010/0306192 | A1 | 12/2010 | Kapur et al. |
| 2013/0014136 | A1 | 1/2013 | Bhatia et al. |
| 2013/0081084 | A1 | 3/2013 | Scheer |
| 2013/0302005 | A1 | 11/2013 | Harwell et al. |
| 2014/0068455 | A1 | 3/2014 | Motgi et al. |
| 2014/0344880 | A1 | 11/2014 | Geller et al. |
| 2015/0296234 | A1 | 10/2015 | Korst et al. |

*Primary Examiner* — Jay A Morrison
(74) *Attorney, Agent, or Firm* — Lowenstein Sandler LLP (57) ABSTRACT

A computer-implemented method for determining the audience appeal of a video hosted by a video hosting service. A video hosting service receives user rating information and user source information about a user who watches a video. Users were not exposed to the video by the video hosting service are included in an "early audience" group, and users who were exposed to the video by the video hosting service are included in a "late audience" group. The video hosting service then calculates a sentiment metric for the early audience and late audience, where the sentiment metric indicates how much the users in each group liked the video. Based on the early audience and late audience sentiment metrics, the video tracking module determines whether the video has a wide audience appeal or a narrow audience appeal.

17 Claims, 6 Drawing Sheets

DETECTION OF POPULAR CONTENT WITH NARROW APPEAL

CROSS-REFERENCE TO RELATED APPLICATIONS

This application is a continuation of U.S. application Ser. No. 14/718,840, filed May 21, 2015, which claims the benefit of U.S. Provisional Application No. 62/001,597, filed May 21, 2014, which is incorporated by reference in its entirety.

BACKGROUND

Field

Described embodiments generally relate to the field of digital content items, and more specifically, to determining whether a popular digital content item has a wide or narrow audience appeal.

Background

Services that provide digital media to users often select some of that content to promote, for example by displaying popular digital content items on a website's main page. Ideally, content that is selected for promotion will have broad appeal to content consumers, rather than alienating them. One way of selecting content to promote is by choosing items that are trending upward in viewership or receiving high review scores. However, because the early audience for content may not be representative of the tastes of a broader consumer base, these methods of selecting content to promote may in fact provoke a negative response from broad segments of consumers.

SUMMARY

Described embodiments enable recommendation of content items based on a determination that the content items will have wide, rather than narrow, audience appeal. For a particular content item, user sentiment—that is, a user's explicit or implicit response to the content item—is collected along with a determination of how the user discovered the content item. In one embodiment, scores are determined for a content item based on sentiment from a first segment of users that are likely to be intrinsically friendly to the content; and based on sentiment from a second segment of users that are part of a broader audience. An overall prediction of appeal for the content item is then determined, and based on that prediction the content item is selected or not selected for recommendation.

In one embodiment, digital content items are videos that, for example, are hosted by a video hosting service. A video tracking module of the video hosting service receives video rating information and user source information associated with a user of the video hosting service. The video rating information may include an input from the user that indicates how much the user liked the video, such as a "thumb up" or "thumb down," or a percentage rating. The user source information may include an exposure method identifying how the user found her way to viewing the video.

The user may have independently found the video, or the user may have been exposed to the video through a promotion from the video hosting service. Users who were not exposed to the video by the video hosting service are included in an "early audience" group, and users who were exposed to the video by the video hosting service are included in a "late audience" group. The video tracking module then calculates a sentiment metric (or sentiment value) for the early audience and late audience, where the sentiment metric indicates how much the users in each group liked the video. Based on the early audience and late audience sentiment metrics, the video tracking module determines whether the video has a wide audience appeal or a narrow audience appeal. If the video has a wide audience appeal, the video hosting service may continue to promote the video. If the video has a narrow audience appeal, the video hosting service may demote the video. Alternatively, a service that aims to present controversial content may choose to promote content that leads to debate and demote uncontroversial content.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
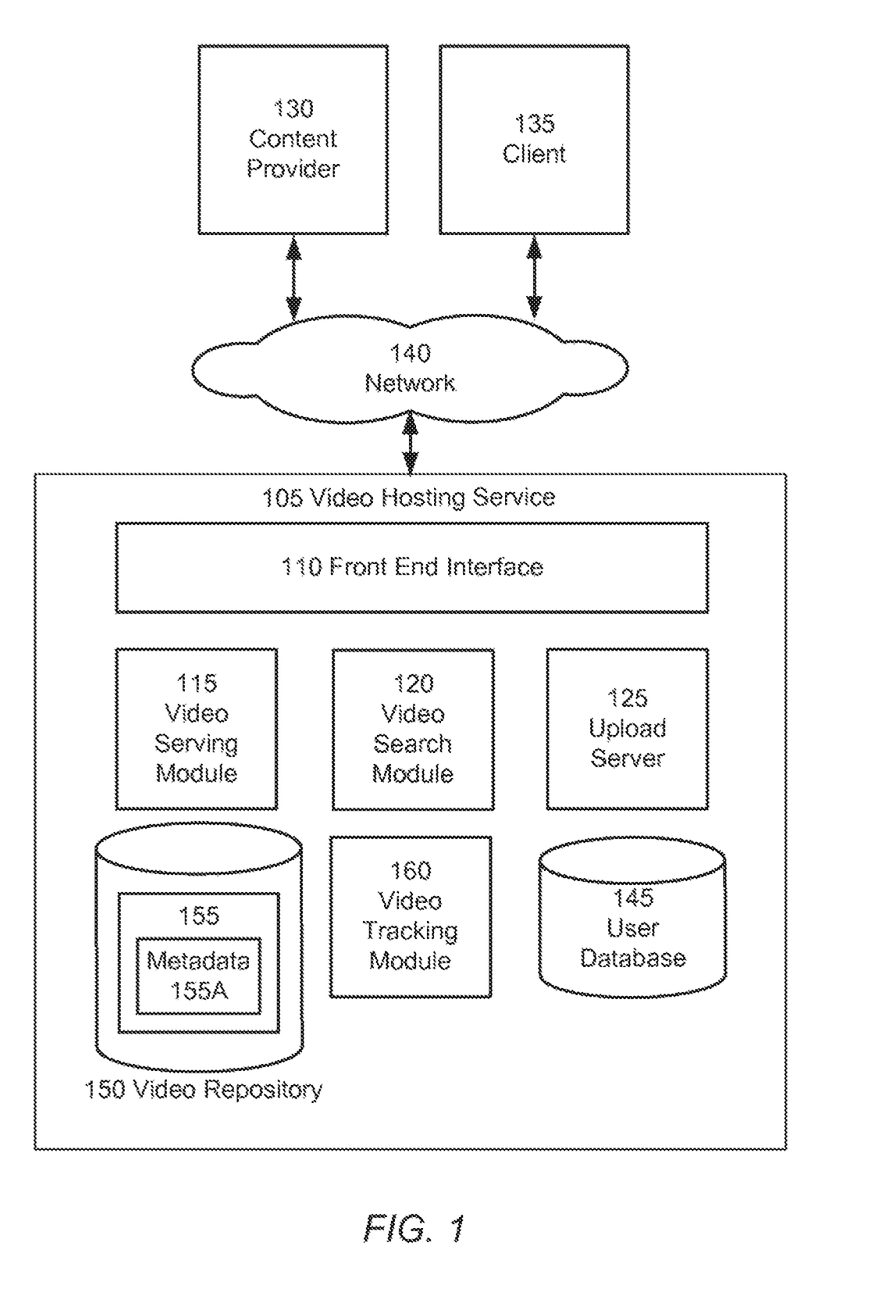
FIG. 1 is a block diagram of a system for predicting appeal of a digital content item according to one embodiment.

FIG. 1 is a block diagram of a system for predicting appeal of a digital content item according to one embodiment. It is appreciated that audience appeal detection may also be performed in the context of other types of systems, such as audio streaming systems or, more generally, any system that provides media files to users, and is not limited to use in the specific context illustrated in FIG. 1 for purposes of example.

A video hosting service 105 represents a system that stores and provides videos to clients such as client device 135, including both user-generated videos and commercially/professionally generated videos. The video hosting service 105 communicates with a plurality of content providers 130 and client devices 135 via a network 140 to facilitate sharing of video content between users. Note that in FIG. 1, for the sake of clarity only one instance each of content provider 130 and client 135 are shown, though there could be any number of each. The video hosting service 105 additionally includes a front end interface 110, a video serving module 115, a video search module 120, an upload server 125, a user database 145, a video repository 150, and a video tracking module 160. Other conventional features, such as firewalls, load balancers, authentication servers, application servers, failover servers, site management tools, and so forth are not shown so as to more clearly illustrate the features of the video hosting service 105. One example of a suitable service 105 is the YOUTUBE website, found at www.youtube.com. Other video hosting services are known, as well, and can be adapted to operate according to the teachings disclosed herein, similarly, systems which host audio recordings, images, interactive graphics, text or hypertext documents, and downloadable applications can be adapted to be operated as described herein. The illustrated components of the video hosting service 105 can be implemented as single or multiple components of software and/or hardware. In general, functions described in one embodiment as being performed by one component can also be performed by other components in other embodiments, or by a combination of components. Furthermore, functions described in one embodiment as being performed by components of the video hosting service 105 can also be performed by one or more clients 135 in other embodiments if appropriate.

Client devices 135 are computing devices that execute client software. e.g., a web browser or built-in client application, to connect to the front end interface 110 of the video hosting service 105 via a network 140 and to display videos. The client device 135 might be, for example, a personal computer, a personal digital assistant, a cellular, mobile, or smart phone, laptop computer, television, set top box, game console, public indoor or outdoor display, movie theater or wearable computer.

The network 140 is typically the Internet, but may be any network, including but not limited to a LAN, a MAN, a WAN, a mobile wired or wireless network, a cloud computing network, a private network, or a virtual private network. Client device 135 may comprise a personal computer or other network-capable device such as a personal digital assistant (PDA), a mobile telephone, a pager, a television "set-top box," and the like.

Conceptually, content provider 130 is an entity that provides video content to the video hosting service 105 and the client 135 views that content. In practice, some content providers (e.g., individual users who upload user generated content) may also be content viewers. Additionally, the content provider 130 may be the same entity that operates the video hosting service 105.

The content provider 130 operates a client device to perform various content provider functions. Content provider functions may include, for example, uploading a video file to the video hosting service 105, editing a video file stored by the video hosting service 105, or editing content provider preferences associated with a video file.

The client 135 operates on a device to view video content stored by the video hosting service 105. Client 135 may also be used to configure viewer preferences related to video content. In some embodiments, the client 135 includes an embedded video player such as, for example, the FLASH player from Adobe Systems. Inc. or any other player adapted for the video file formats used in the video hosting service 105. Note that the terms "client" and "content provider" as used herein may refer to software providing client and content providing functionality, to hardware on which the software executes, or to the entities operating the software and/or hardware, as is apparent from the context in which the terms are used.

The upload server 125 of the video hosting service 105 receives video content from a content provider 130, and processes the content for storage and playback. Received content is stored in the video repository 150. In response to requests from clients 135, a video serving module 115 provides video data from the video repository 150 to the clients 135. Clients 135 may also search for videos of interest stored in the video repository 150 using a video search module 120, such as by entering textual queries containing keywords of interest, or may browse videos using functionality such as playlists, channels, or recommendations. Front end interface 110 provides the interface between client 135 and the various components of the video hosting service 105.

In some embodiments, the user database 145 is configured to maintain a record of all registered users of the video hosting service 105. Registered users include content providers 130 and/or users of clients 135 who simply view videos on the video hosting service 105. Each content provider 130 and/or individual user registers account information including, which may include login name, electronic mail (e-mail) address and password with the video hosting service 105, and is provided with a unique user ID. The user ID can be based on any identifying information, such as the user's IP address, user name, or the like. This account information is stored in the user database 145. Users have the opportunity to specify that the account information not be shared with other components of the video hosting service 105, or with other third-party systems. In some embodiments, users that have not registered may still use the video hosting service 105, though some features may be unavailable to those unregistered users.

The video repository 150 contains a set of videos 155 submitted by users. The video repository 150 can contain any number of videos 155, such as tens of thousands or hundreds of millions. Each of the videos 155 has a unique video identifier that distinguishes it from each of the other videos, such as a textual name (e.g., the string "a91qrx8"), an integer, or any other way of uniquely naming a video. The videos 155 can be packaged in various containers such as AVI, MP4, or MOV, WebM, and can be encoded using video codecs such as VP8, MPEG-2, MPEG-4, H.264, and the like.

In addition to their audiovisual content, the videos 155 further have associated metadata 155A. In one embodiment, the metadata 155A includes textual metadata such as a video title, a video description, and/or tags provided by a user who uploaded the video, as well as user comments provided by users viewing the video. The metadata 155A may also include an uploader-specified category designating one of a set of categories specified by the video hosting service 105, such as sports, entertainment, music, or the like. The metadata 155A may further include information indicating whether a user was exposed to the video through a promotion by the video hosting service 105. Although such textual metadata are typically provided by the video uploader and/or other users, they may also be provided or modified automatically by the video hosting service 105.

The video hosting service 105 further comprises a video tracking module 160 that receives user source information and video rating information, and calculates video sentiment metrics. User source information includes how a user arrived at a particular video, for example whether she was exposed to the video by the video hosting service 105 or through another means, such as a direct link shared by a friend, for example, through a social networking medium, or via an embedded video on a third-party service. Video rating information includes explicit or implicit ratings for a video submitted by users of client devices 135, such as likes or dislikes of a video, how much of a video was watched by the user, and the like. Other examples of ratings submitted by users may include percentage ratings or flags for specific types of content. The video tracking module 160 uses the user source information and video rating information to determine whether the associated video appeals to a narrow or wide audience. For example, if a video generally has positive ratings and most of the ratings are from a group of users who were exposed to the video by the video hosting service 105, the video tracking module 160 may assume that the composition of the group of users is relatively random. In this case, the video tracking module 160 may infer that the video has a wide audience appeal. On the other hand, if a video has positive ratings from a group of users who accessed the video via shared links with other users, the video tracking module 160 may assume that that group of users consists primarily of people with similar interests. In this case, the video tracking module 160 may infer that the video has a narrow audience appeal. The video tracking module 160 is now described in greater detail with reference to FIG. 2.

Figure 2:
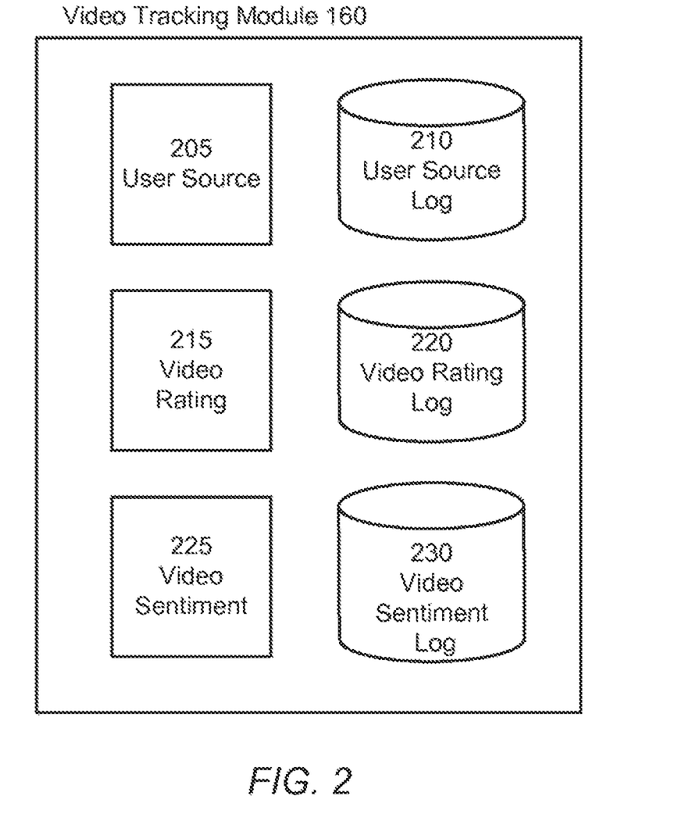
FIG. 2 illustrates components of a video tracking module according to one embodiment.

FIG. 2 illustrates the various components of the video tracking module 160, according to one embodiment. The video tracking module 160 includes a user source module 205, a user source log 210, a video rating module 215, a video rating log 220, a video sentiment module 225, and a video sentiment log 230. For purposes of clarity of explanation, we describe determining audience appeal for videos. However, it is appreciated that the digital content items that are analyzed need not be videos. For example, in other embodiments, the digital content items may be digital images or digital audio files. In addition, though illustrated separately, the user source log 210, video rating log 220 and video sentiment log 230 may be implemented as a single log, or in various other combinations desired by the implementer to perform an equivalent function.

Video tracking module 160 receives a notification, e.g., from video serving module 115, that a video has been requested by a viewer. User source module 205 then determines how the user arrived at the video, for example, whether the video was shared with the user by another user, or if the video was recommended to the user directly by the video service provider 105 (e.g., as a recommendation via front end interface 110 or through a link in an email from the video service provider 105). The user source log 210 stores the information from the user source module 205. The video rating module 215 receives a rating for the video from the user, indicating the user's opinion of the video. The video rating log 220 stores the information from the video rating module 215. The video sentiment module 225 calculates a sentiment metric (sentiment value) for the video based on the information from the user source module 205 and video rating module 215. In some embodiments, the video sentiment metric may comprise a determination of whether or not the video has a narrow or wide audience appeal. The video sentiment log 230 stores the information from the video sentiment module 230. The various components of the video tracking module 160 are now described in greater detail.

The user source module 205 determines how a user arrived at a video. Registered and unregistered users of the video hosting service 105 may access the video through various methods. Some users may be exposed to a video by the video hosting service 105, for example by seeing the video being displayed on the home page of a web site affiliated with the video hosting service 105, or by receiving an email from the video hosting service 105 that is promoting the video. Other users may intentionally come across a video, without the video being promoted by the video hosting service 105. For example, a user may search for a particular video or subject (e.g. "gun control"), or a user may send a direct link to a video to another user. The user source module 205 may then determine how the user arrived at the video using a variety of different methods, in one embodiment, the URL of the video contains a parameter indicating the video was recommended to the user by the video hosting service 105. Alternatively, at the discretion of the implementer the HTTP header may include an indicator, the request for the video may contain a custom payload, or browser cookies may be used. The video metadata 155A may comprise information that indicates whether the user viewed the video through a promotion by the video hosting service 105. Regardless of the method used to identify how the user arrived at the video, the user source module 205 determines the exposure method—that is, whether or not the video was presented to the user by the video hosting service 105. The user source log 210 then stores the exposure method determined by the user source module 205 in association with the user.

The video rating module 215 receives and determines a user's rating for a video. The video hosting service 105 may provide a user several different methods to provide a rating for a video which represents the user's opinion of the video, further described below with reference to FIG. 5. For example, a user may be able to "thumb up" or "thumb down" a video, indicating that he either likes or dislikes the video, respectively. In other embodiments, the video hosting service 105 may allow the user to give the video a percentage rating, from 0 to 100 percent, indicating how much he liked the video. Additionally, the video hosting service 105 may allow the user to "flag" a video in order to indicate that the video contains a particular type of content, for example content that is inappropriate to be hosted and shown by the video hosting service 105. The video rating module 215 may receive other information regarding the user's interaction with the video, as well. For example, the video rating module 215 may receive the length of time for which the user viewed the video. A longer viewing time may be correlated with a higher likelihood of the user favoring the content of the video, and a shorter viewing time may be correlated with a higher likelihood of the user disagreeing with the content of the video. Alternatively, the video rating module 215 may also perform comment sentiment analysis on any comments the user leaves regarding the video. By performing such analysis, the video rating module 215 can determine whether the user has positive or negative feelings regarding the video, even if the user does not explicitly rate the video, for example using a "thumb up" or "thumb down" indicator as described above. The user may also decide to follow or subscribe to a channel or content stream provided by a particular content provider 130. The video rating module 215 can detect the selection of a follow or subscribe option and may determine that the user likes the video from the associated content provider 130 that the user has most recently viewed. The video rating log 220 then stores the video rating information received by the video rating module 215 in association with the user. At this point, the video tracking module 160 has stored an exposure method and a video rating associated with a user and a video the user has viewed.

The video sentiment module 225 receives the exposure method and rating associated with the user who has viewed the video. Using this received information, the video sentiment module 225 then calculates one or more sentiment metrics for the video. In some embodiments, the video sentiment module 225 calculates an early audience sentiment metric and a late audience sentiment metric. The early audience sentiment metric is associated with users who were not exposed to the video through a promotion by the video hosting service 105, and the late audience sentiment metric is associated with users who were exposed to the video through a promotion by the video hosting service 105. The early and late audience sentiment metrics may be a percentage value that represents the ratio of users who indicated they liked the video. In other embodiments, the early and late audience sentiment metrics may be represented differently, for example, a metric as simple as whether or not the majority of users liked or disliked the video. In other embodiments, the early and late audience sentiment metrics are calculated based on other information, such as length of viewing time for the video, comment sentiment analysis, and flags the video receives, as described below.

To calculate the early audience sentiment metric, the video sentiment module 225 first identifies users who viewed the video without being exposed to the video by the video hosting service 105. The video sentiment module 225 may identify the early audience by using exposure method information received from the user source module 205 or user source log 210. This group of users is referred to as the "early audience" because these users viewed the video without the video being promoted by the video hosting service 105. This group of users may include users who viewed the video because they share similar opinions regarding the content of the video (e.g. in favor of gun control). The early audience users may have independently searched for the video, or may have shared a link to the video amongst one another, or the video may have been embedded on a third-party service that caters to users with a particular affinity or viewpoint. Typically, the early audience users were referred to the video by other uses who share similar viewpoints or ideologies. The video sentiment module 225 then identifies the video ratings submitted by each member of the early audience by using video rating information received from the video rating module 215 and the video rating log 220. Finally, the video sentiment module 225 uses the video rating information associated with the early audience and calculates the early audience video sentiment metric, described in more detail below with reference to FIG. 3B. In some embodiments, video sentiment module 225 weights video ratings from different users or categories of users differently. For example, a positive rating from users who typically give positive ratings to videos may be weighted differently than a positive rating from users who rarely rate videos, or rarely rate videos positively. A particular weighting factor may be decided according to the preference of the implementer.

Once a video receives enough views from an early audience, the video may start trending, or gaining in popularity. The video hosting service 105 may define a threshold value to determine whether or not a video is trending, such as a minimum number of views within a specified time period. Once a video is trending, the video hosting service 105 may decide to promote the video even further, by posting the video on a home page or by emailing a link to the trending video to various users of the video hosting service 105. The users who are exposed to the video via direct promotion from the video hosting service 105 are referred to as the late audience. To calculate the late audience sentiment metric, the video sentiment module 225 identifies users who viewed the video because they were exposed to the video by the video hosting service 105. The video sentiment module 225 may identify the late audience by using exposure method information received from the user source module 205 or user source log 210. This group of users is referred to as the late audience because these users viewed the video after the video was promoted by the video hosting service 105. That is, the late audience users were referred to the video via a promotion from the video hosting service 105. This group of users may include users who do not necessarily share similar opinions about the content of the video and are randomly selected (e.g., a random portion of the users favor gun control and a random portion of the users are opposed to gun control). The video sentiment module 225 then identifies the video ratings submitted by each member of the late audience by using video rating information received from the video rating module 215 or the video rating log 220. Finally, the video sentiment module 225 uses the video rating information associated with the late audience and calculates the late audience video sentiment metric, described in further detail below with reference to FIG. 3B. The video sentiment log 230 stores the early and late audience video sentiment metrics calculated by the video sentiment module 225.

The various techniques performed by the video tracking module 160 in different embodiments are now discussed.

Figure 3A:
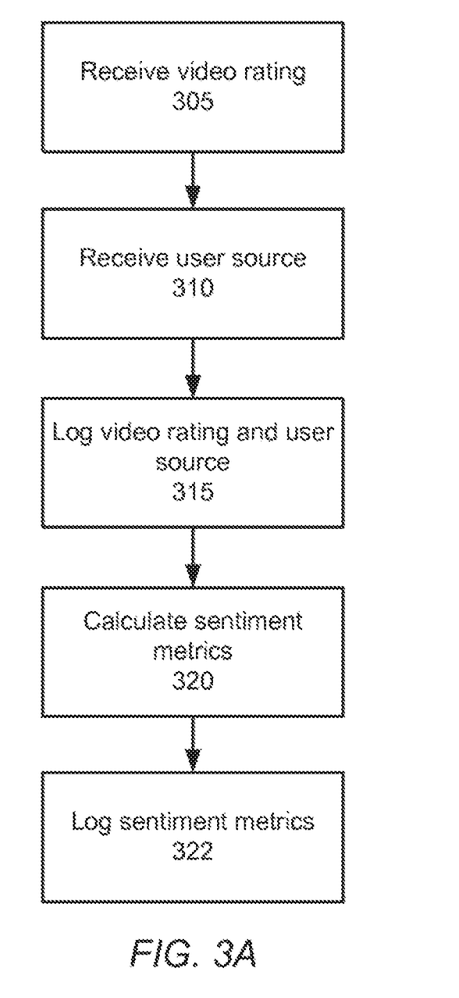
FIG. 3A is a flowchart illustrating a process for calculating a sentiment metric for a digital content item according to one embodiment.

FIG. 3A is a flowchart that illustrates the operations involved in determining whether a video has narrow or wide audience appeal according to one embodiment. The video tracking module 160 receives video rating information 305 associated with a user watching a video. The video rating information is received by the video rating module 215 and may comprise a representation of how much the user liked the video, as described above with reference to FIG. 2. The video tracking module 160 then receives user source information 310, associated with the user watching the video. The user source information is received by the user source module 205 and may comprise the exposure method, described above with reference to FIG. 2. Once the user source information has been received, the video tracking module 160 logs the video rating information and user source information 315. The video rating information and user source information are stored in the video rating log 220 and user source log 210, respectively, as described above with reference to FIG. 2. Finally, using the stored video rating information and user source information, the video tracking module 160 calculates one or more audience sentiment metrics 320 and logs the sentiment metrics 322. The sentiment metric calculation 320 is performed by the video sentiment module 225 and is stored in the video sentiment log 230, as described above with reference to FIG. 2. The sentiment metric calculation 320 is described in further detail with reference to FIG. 3B below.

Figure 3B:
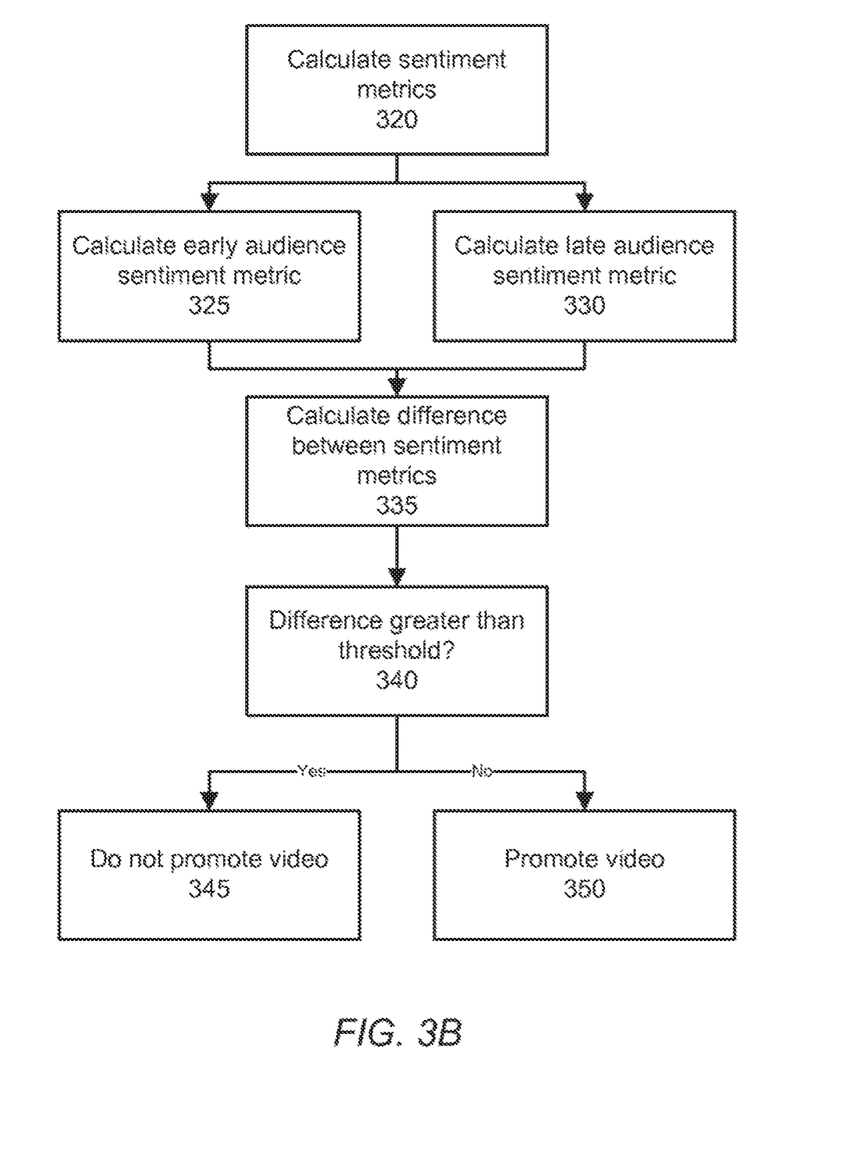
FIG. 3B is a flowchart illustrating a process of determining whether a digital content item has narrow or wide audience appeal according to one embodiment.

FIG. 3B is a flowchart that illustrates the detailed process of calculating video sentiment metrics and determining video audience appeal, according to one embodiment. The video sentiment module 225 uses the video rating information and user source information to calculate an early audience sentiment metric 325 and a late audience sentiment metric 330. As described above with reference to FIG. 2, the video sentiment module 225 calculates an early audience sentiment metric 325 by identifying the users associated with the early audience according to exposure method information received from the user source module 205 or user source log 210. The video sentiment module 225 then identifies the video rating information associated with the early audience users, and calculates the early audience sentiment metric, as described above with reference to FIG. 2. Similarly, the video sentiment module 225 calculates a late audience sentiment metric 330 by identifying the users associated with the late audience according to exposure method information received from the user source module 205 and user source log 210. The video sentiment module 225 then identifies the video rating information associated with the late audience users, and calculates the late audience sentiment metric, as described above with reference to FIG. 2. In some embodiments, the early and late audience sentiment metrics may be a percentage value that represents the ratio of users who indicated they liked the video.

The early and late audience sentiment metrics may also include a confidence interval or other measure representing the statistical significance of the calculated sentiment metric. In one example, if the video ratings comprise a "thumb up" or a "thumb down" option, the early audience sentiment metric may be a value representing what percentage of the early audience users selected the "thumb up" option. In another example, if the video ratings comprise a percentage value indicating the users' opinions of the video, the early audience sentiment metric may be calculated by taking the average of all of the early audience users' ratings. In other embodiments, the early and late audience sentiment metrics may be determined using other methods.

Once the video sentiment module 225 has calculated the early and late audience sentiment metrics, the video sentiment module 225 calculates the difference 335 between the early and late audience sentiment metrics. The method by which the difference between the early and late audience sentiment metrics is calculated may depend on how the early and late audience sentiment metrics are represented. As described above, the audience sentiment metrics may be represented by a percentage value indicating the proportion of users who "thumbed up" (liked) or "thumbed down" (disliked) a video. In this case, the difference between the early and late audience sentiment metrics may simply be a magnitude difference, or a subtraction of one audience sentiment percentage value from the other audience sentiment percentage value. In an example scenario, 79% of the early audience users may indicate that they like a video (the early audience sentiment metric), and 75% of the late audience users may also indicate that they like the same video (the late audience sentiment metric). The calculated difference between the early and late audience sentiment metrics would then simply be 4%. In other embodiments, the difference may be calculated in a manner other than subtracting the early and late audience sentiment metric values. In other embodiments, the video sentiment module 225 may utilize other video rating information, such as length of time spent viewing the video, in order to calculate the early and late audience sentiment metrics, described in more detail below.

Once the difference between the early and late audience sentiment metrics have been calculated, the video sentiment module 225 determines whether the difference is greater than a given threshold value 340. The threshold value may be a predetermined numerical value, and the calculated difference between the early and late audience sentiment metrics may be compared relative to the threshold value. For example, in the example scenario described above, the threshold value may be predetermined to be 20%. Thus, because the calculated difference between the early and late audience sentiment metrics is 4%, the calculated difference is determined to be less than the threshold value.

If the difference between the early and late audience sentiment metrics is greater than the threshold, the video sentiment module 225 may determine that the video hosting service 105 should no longer promote the video 345. A large difference between the early audience sentiment metric and the late audience sentiment metric may indicate that the video has a narrow audience appeal, and that users of the wider audience who view the video due to exposure from the video hosting service 105 will not enjoy the video. However, if the difference between the early and late audience sentiment metrics is less than the threshold, the video sentiment module 225 may determine that the video hosting service 105 should continue to promote the video 350. A small or negligible difference between the early audience sentiment metric and the late audience sentiment metric may indicate that the video has a wide audience appeal, and that users who view the video due to exposure from the video hosting service 105 will generally enjoy the video. In the example scenario described above, the difference between the early and late audience sentiment metrics of 4% was determined to be less than the predetermined threshold value of 20%. Therefore, the video sentiment module 225 may determine that the video has a wide audience appeal, and the video hosting service 105 should keep promoting the video, for example, by continuing to post the video on the home page of the video hosting service 105 and continuing to send out emails containing a link to the video. In some embodiments, the video hosting service 105 automatically removes the video (digital content item) from a set of digital content items m commended to users of the video hosting service 105. In some embodiments, the video hosting service 105 automatically adds the video (digital content item) to a set of digital content items recommended to users of the video hosting service 105.

In other embodiments, the video sentiment module 225 may use a different method to calculate the difference between the early and late audience sentiment metrics. For example, the video sentiment module 225 may calculate the percentage difference between the early and late audience sentiment metrics. This also represents a magnitude difference, and the difference between the two sentiment metrics may be calculated be the equation:

$$\Delta S = \frac{|S_E - S_L|}{S_E}$$

In the above equation, $\Delta S$ is the difference between the early and late audience sentiment metrics, $S_E$ is the early audience sentiment metric, and $S_L$ is the late audience sentiment metric. In the example scenario described above, the early audience sentiment metric was calculated to be 79%, and the late audience sentiment metric was calculated to be 75%. So, the difference between the two sentiment metrics would be calculated as follows:

$$\Delta S = \frac{|79\% - 75\%|}{79\%}$$
$$\Delta S = 5.1\%$$

In another embodiment, the video sentiment module 225 may not need to calculate a difference between the early and late audience sentiment metrics, and may only look at the general sentiment directions. For example, the majority of the early audience users may favor a video, resulting in an early audience sentiment metric of 75%, indicating that 75% of the early audience users liked the video. However, the majority of the late audience users may dislike a video, resulting in a late audience sentiment metric of 20%, indicating that only 20% of the late audience users liked the video. Because the early audience sentiment metric is above 50% (the majority of early audience users reacted positively to the video), while the late audience sentiment metric is below 50% (the majority of late audience users reacted negatively to the video), the video sentiment module 225 may determine that the video has a narrow audience appeal and that the video hosting service 105 should not promote the video. In some embodiments, the video sentiment module 225 may take into account both the magnitude difference and the direction difference between the early and late audience sentiment metrics when determining the audience appeal of a video. In various embodiments, other decision techniques may be used to estimate a difference in sentiment. For example, a clustering technique may be employed, or a machine learning technique using a training set may be used, as will be clear to those of skill in the art.

In some embodiments, the video sentiment module 225 may require a minimum number of users in the early audience and late audience groups before determining the audience appeal of a video. The video sentiment module 225 may also establish a confidence interval around both the early and late audience sentiment metrics, and may proceed to determine the audience appeal of a video once a specified confidence interval at a specified confidence level is attained. The video sentiment module 225 may use other measures to determine the statistical significance of the sentiment metrics before determining the audience appeal of a video, such as using a P-test, a T-test, or statistical hypothesis test.

Figure 4A:
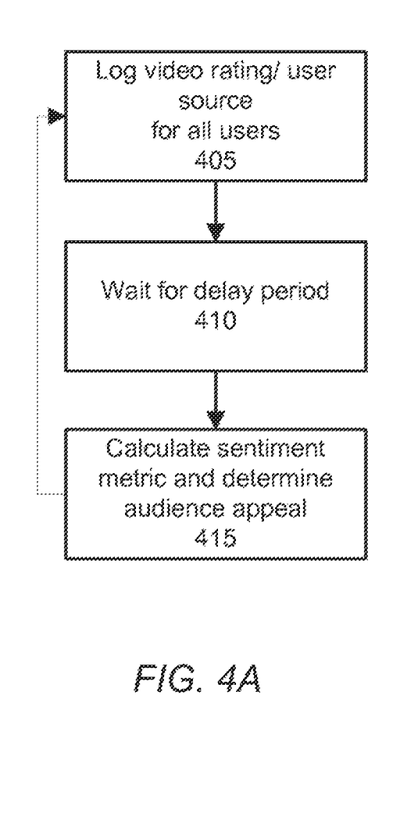
FIG. 4A is a flowchart illustrating a process of updating a sentiment metric for a digital content item using a batch processing method according to one embodiment.

FIG. 4A is a flowchart illustrating the process of updating the audience appeal of a video using a batch processing method. The process begins with the video sentiment module 225 logging video rating and user source information 405 for all users who view a video. The video sentiment module 225 continues to log the video rating and user source information until a specified delay period has passed 410. In some embodiments, the delay period may be defined by a length of time, such as 15 minutes. In other embodiments, the delay period may be defined by a threshold number of views for a given video, such as 1,000 views. Once the delay period has passed, the video sentiment metric calculates the sentiment metric and determines the audience appeal 415 for the video, and then continues to log video rating and user source information 405, repeating the process until otherwise commanded to stop. It is advantageous to update the video sentiment and audience appeal values using a batch processing method due to decreased processing requirements. However, in certain instances, it may be advantageous to calculate an audience appeal on a real time basis.

Figure 4B:
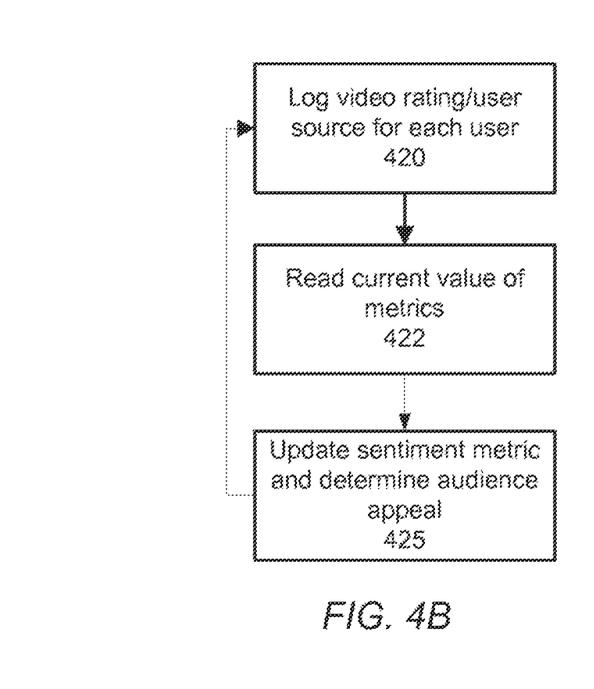
FIG. 4B is a flowchart illustrating a process of updating a sentiment metric for a digital content item in real time according to one embodiment.

FIG. 4B is a flowchart illustrating the process of updating the audience appeal of a video in real time. The process begins with the video sentiment module 225 logging video rating and user source information 405 for a user who views a video 420. Using the video rating and user source information associated with the user, the video sentiment module 225 reads 422 the current value of the sentiment metrics, updates the sentiment metric and determines the audience appeal 425 for the video, and then logs the video rating and user source information for the next user who views the video 420, repeating the process until otherwise commanded to stop. While the process depicted in FIG. 4B allows the video sentiment module to calculate a video sentiment metric and an audience appeal in real time, the process is also resource intensive. Therefore, in some embodiments, a hybrid process may be implemented, where a portion of the video sentiment metric is calculated using the batch processing method depicted in FIG. 4A, and the remainder of the video sentiment metric is calculated using the real time method depicted in FIG. 4B. For example, if the delay period in FIG. 4A is specified to be 15 minutes, the real time processing depicted in FIG. 4B may only calculate real-time values using data from each 15-minute segment. Once 15 minutes has passed, the video sentiment module 225 updates the overall sentiment metric and audience appeal, and the real time process resets and begins calculating a new real-time score based on the next 15 minute segment of data.

Figure 5:
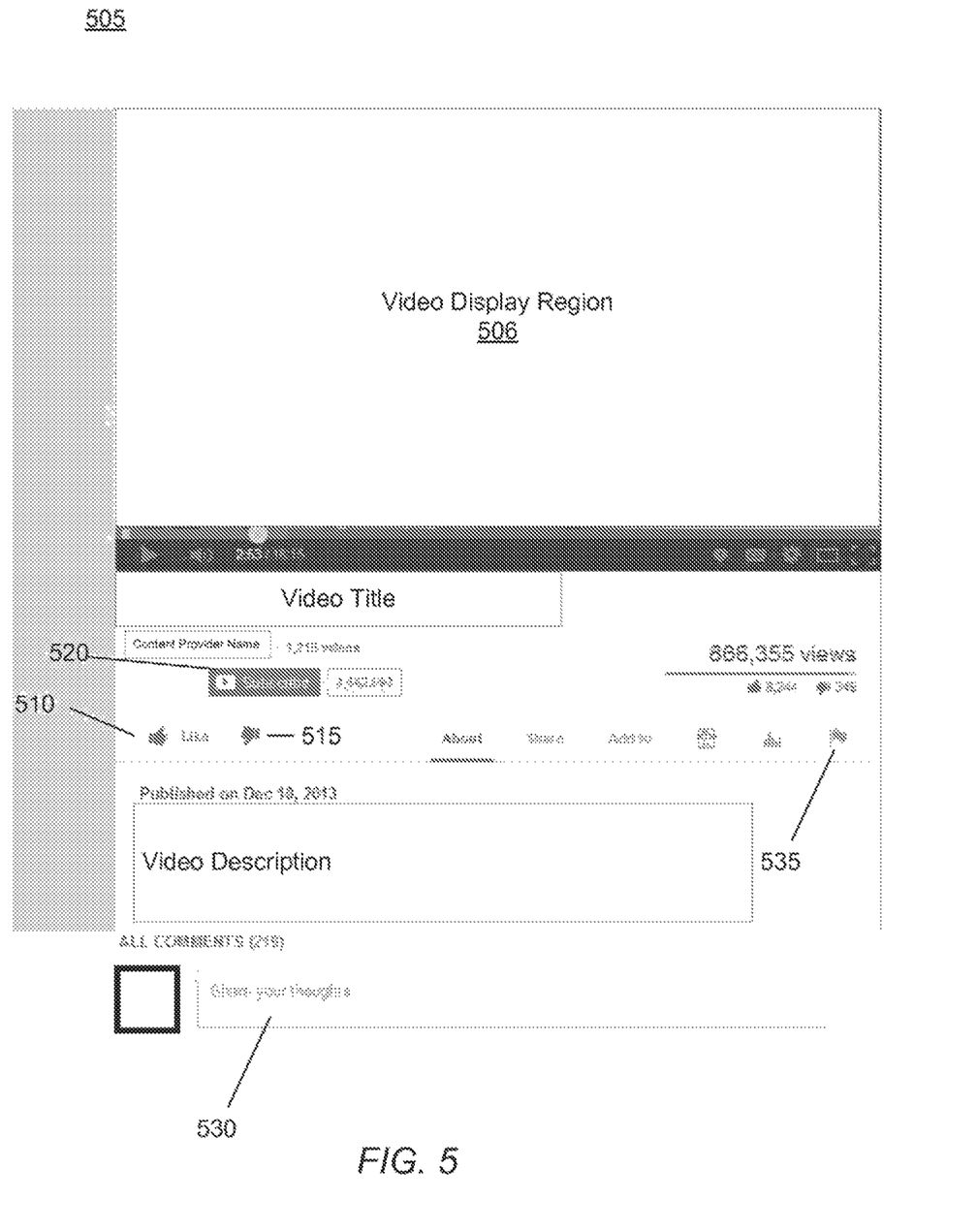
FIG. 5 illustrates a graphical user interface for a video hosting service, according to one embodiment.

FIG. 5 illustrates a graphical user interface 505 used by the video hosting service 105, according to one embodiment. The graphical user interface 505 may be transmitted from the video hosting service 105 through the network 140 to be displayed on a client device 135. The graphical user interface 505 comprises a video display region 506 to display a video 155. The video display region 506 may also display some or all of the metadata 155A associated with the video 155, such as the title of the video. The graphical user interface 505 also comprises several options for a user of the video hosting service 105 to indicate whether or not he likes the video 155 being displayed. The user can select a "thumb up" option 510 to indicate he likes the video 155, or a "thumb down" option 515 to indicate he dislikes the video 155. If the user believes he will enjoy other media content from the same content provider 130 who provided the video 155, the user may subscribe to 520 or follow the content provider 130. Selecting the subscribe option 520 may indicate to the video hosting service 105 that the use wishes to receive updates regarding the content provider 130, such as email notifications when the content provider 130 uploads new media content. The graphical user interface 505 further comprises a comment option 530 to allow the user to leave a comment regarding the video 155 being displayed in the video display region 506. The comment may contain information that indicates whether or not the user liked the video. The graphical user interface 505 may also include a flag option 535. The flag option 535 may be used to allow a user to indicate to the video hosting service 105 that the video contains inappropriate content. In some instances, the video hosting service 105 may review the content of the video and decide to remove or censor the content of the video.

In alternative embodiments, users may be further separated to obtain more granular results. For example, the early audience group may be divided into those users whose source for the video was a social network, or a shared link, an instant message, or other method. Users may also be categorized in some embodiments according to demographics (e.g., age, gender, location) or behavior (e.g., propensity to watch, propensity to rate, past history). In some embodiments the content itself is further analyzed, for example by performing a semantic analysis of the content or its metadata or determining the age of the content, to predict the breadth of appeal of the content.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disk, CD-ROMs magnetic-optical disks, read-only memories (ROMs), random access memories (RAMs). EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for promoting a digital content item to an audience, the method comprising:
   identifying, by a computer, the digital content item from a plurality of digital content items recommended to users of a digital content item hosting service;
   determining, by the computer, whether to continue to recommend the digital content item to the users of the digital content item hosting service, wherein the determining comprises:
      determining, by the computer, a first sentiment value for the digital content item with respect to a first set of users that accessed the digital content item provided to the first set of users via a recommendation from a server at the digital content item hosting service;
      determining, by the computer, a second sentiment value for the digital content item with respect to a second set of users that accessed the digital content item provided to the second set of users via a source other than the recommendation from the digital content item hosting service; and
      comparing, by the computer, the first sentiment value and the second sentiment value to determine whether to continue to recommend the digital content item;
   responsive to a difference between the first and second sentiment values being within a threshold amount, continuing to recommend the digital content item to the users of the digital content item hosting service; and
   responsive to the difference between the first and second sentiment values exceeding the threshold amount, automatically removing, by the computer, the digital content item from the plurality of digital content items recommended to the users of the digital content item hosting service.

2. A computer-implemented method comprising:
   identifying a video from a plurality of videos recommended to users of a digital content item hosting platform; and
   determining whether to continue to recommend the video to the users of the digital content item hosting platform, wherein the determining comprises:
      receiving a plurality of video ratings for the video;
      receiving a plurality of user sources providing access to the video to a user;
      identifying, based on the plurality of user sources, a first plurality of users who viewed the video using a first user source of the plurality of user sources, wherein the first user source provides access to the video via a recommendation from a server at the digital content item hosting platform;

identifying, based on the plurality of user sources, a second plurality of users who viewed the video using a second user source of the plurality of user sources, wherein the second user source provides access to the video via a source other than the recommendation from the server at the digital content item hosting platform;

determining, based on the video ratings, a first sentiment metric associated with the first plurality of users;

determining, based on the video ratings, a second sentiment metric associated with the second plurality of users; and comparing the first sentiment metric and the second sentiment metric to determine whether to continue to recommend the video to the users of the digital content item hosting service including recommending the video to additional users;

responsive to a difference between the first and second sentiment metrics being within a threshold amount, continuing to recommend the video to the users of the digital content item hosting platform; and responsive to the difference between the first and second sentiment metrics exceeding the threshold amount, automatically removing the video from the plurality of videos recommended to the users of the digital content item hosting platform.

3. The computer-implemented method of claim 2, wherein each of the plurality of video ratings is associated with each of either the first plurality of users or the second plurality of users.

4. The computer-implemented method of claim 3, wherein each of the plurality of video ratings indicates an affinity of each of the associated plurality of users for the video.

5. The computer-implemented method of claim 4, wherein each of the plurality of video ratings is selected from the group consisting of a like/dislike option, a percentage rating option, and a flag option.

6. The computer-implemented method of claim 2, wherein each of the plurality of user sources is associated with each of either the first plurality of users or the second plurality of users.

7. The computer-implemented method of claim 6, wherein each of the plurality of user sources indicates whether or not each of the associated plurality of users was provided access to the video via a recommendation by a video hosting service.

8. The computer-implemented method of claim 2, wherein determining whether to continue to recommend the video to the users further comprises:

determining a difference between the first sentiment metric and the second sentiment metric;

responsive to the difference exceeding a threshold value, automatically discontinuing recommendation of the video; and responsive to the difference not exceeding a threshold value, continuing recommendation of the video.

9. The computer-implemented method of claim 8, wherein determining the difference between the first sentiment metric and the second sentiment metric comprises subtracting the first sentiment metric from the second sentiment metric.

10. The computer-implemented method of claim 8, wherein determining the difference between the first sentiment metric and the second sentiment metric comprises calculating a percentage change value from the first sentiment metric to the second sentiment metric.

11. The computer-implemented method of claim 8, wherein automatically discontinuing recommendation of the video comprises removing the video from a home page of the digital content item hosting platform, and continuing recommendation of the video comprises adding or keeping the video on a home page of the digital content item hosting platform.

12. The computer-implemented method of claim 2, wherein the first sentiment metric and second sentiment metric are both either a percentage value that represents a ratio of the users who indicated they liked the video or a value that represents whether a majority of users liked the video.

13. The computer-implemented method of claim 2, wherein determining whether to continue to recommend the video to the users is performed in real time.

14. The computer-implemented method of claim 2, wherein determining whether to continue to recommend the video to the users is performed periodically with a delay period between each determination.

15. A non-transitory computer readable storage medium storing instructions executable by a processor, the instructions, when executed, causing the processor to:

identify a video from a plurality of videos recommended to users of a digital content item hosting service;

determine whether to continue to recommend the video to the users of the digital content item hosting service, wherein to determine whether to continue to recommend the video, the processor is further to:

receive a plurality of video ratings for the video;

receive a plurality of user sources providing access to the video to a user;

identify, based on the plurality of user sources, a first plurality of users who viewed the video using a first user source of the plurality of user sources, wherein the first user source provides access to the video via a recommendation from a server at the digital content item hosting service;

identify, based on the plurality of user sources, a second plurality of users who viewed the video using a second user source of the plurality of user sources, wherein the second user source provides access to the video via a source other than the recommendation from the server at the digital content item hosting service;

determine, based on the video ratings, a first sentiment metric associated with the first plurality of users;

determine, based on the video ratings, a second sentiment metric associated with the second plurality of users; and compare the first sentiment metric and the second sentiment metric to determine whether to continue to recommend the video to the users of the digital content item hosting service including recommending the video to additional users;

responsive to a difference between the first and second sentiment metrics being within a threshold amount, continuing to recommend the video to the users of the digital content item hosting service; and responsive to the difference between the first and second sentiment metrics exceeding the threshold amount, automatically removing the video from the plurality of videos recommended to the users of the digital content item hosting service.

16. The storage medium of claim 15, wherein determining whether to continue to recommend the video to the users comprises:
   determining a difference between the first sentiment metric and the second sentiment metric;
   responsive to the difference exceeding a threshold value, automatically discontinuing recommendation of the video; and
   responsive to the difference not exceeding a threshold value, continuing recommendation of the video.

17. The storage medium of claim 16, wherein automatically discontinuing recommendation of the video comprises removing the video from a home page of the digital content item hosting service, and continuing recommendation of the video comprises adding or keeping the video on a home page of the digital content item hosting service.

* * * * *